3,376,303
BENZOTHIOXANTHENE DYESTUFFS AND
PROCESS FOR PREPARING THEM
Otto Fuchs and Helmut Troster, Frankfurt am Main, Germany, assignors to Farbwerke Hoechst Aktiengesellschaft vormals Meister Lucius & Bruning, Frankfurt am Main, Germany, a corporation of Germany
No Drawing. Filed Feb. 8, 1966, Ser. No. 525,861
Claims priority, application Germany, Feb. 24, 1965, F 45,334
10 Claims. (Cl. 260—288)

The present invention provides benzothioxanthene dyestuffs and a process for preparing them, in particular, it provides dyestuffs consisting of a mixture of isomeric compounds of the general formulae

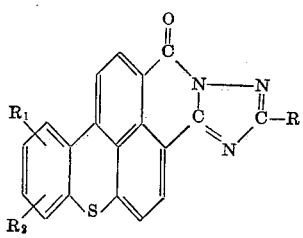

and

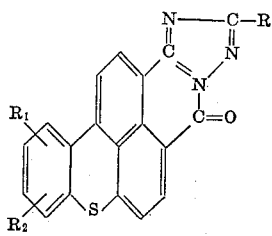

wherein R represents a hydrogen atom, an alkyl-, aralkyl- or aryl which may be substituted, and $R_1$ and $R_2$ represent hydrogen atoms or halogen atoms, alkyl-, aryl-, alkoxy-, acyloxy- or nitro groups.

It has now been found that valuable dyestuffs consisting of a mixture of isomeric compounds of the general formulae

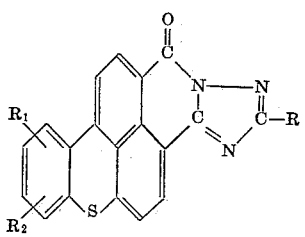

and

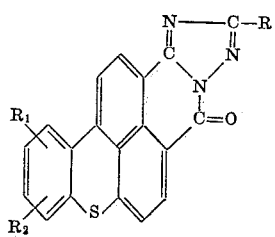

wherein R represents a hydrogen atom, an alkyl-, aralkyl- or aryl group which may be substituted, and $R_1$ and $R_2$ represent hydrogen or halogen atoms, alkyl-, aryl-, alkoxy-, acyloxy- or nitro groups, are obtained by reacting, at an elevated temperature, benzothioxanthene-3,4-dicarboxylic acid hydrazides of the general formula

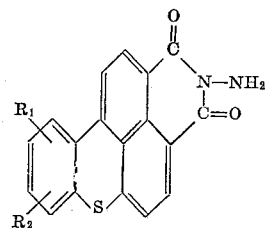

with compounds of the general formula

R—CO—NH$_2$ or R—CN wherein R, $R_1$ and $R_2$ have the meanings given above.

It is suitable to prepare the dyestuffs by heating benzothioxanthene-3,4-dicarboxylic acid hydrazides together with the carboxylic acid amides or carboxylic acid nitriles used, preferably, in an excess amount, to a temperature in the range between about 170 and 300° C. for a prolonged period of time. If necessary, the condensation is carried out under pressure. In this process, condensing agents such as zinc chloride or ammonium chloride may be added to exercise an accelerating effect on the reaction. The dyestuffs formed are isolated in usual manner, if desired, after the reaction mixture has been diluted with an organic solvent, for example, methanol.

For the condensation with the benzothioxanthene-dicarboxylic acid hydrazides, aliphatic, araliphatic or aromatic carboxylic acid amides or carboxylic acid nitriles may be used, for example, formamide, acetamide, butyric acid- and isobutyric acid amide, benzamide, p-methoxybenzamide, β-methoxy-propionitrile, benzylcyanide, benzonitrile, tolunitrile and 3-chlorotoluene-2-benzonitrile.

The benzothioxanthene-3,4-dicarboxylic acid hydrazides (N-aminobenzothioxanthene-3,4-dicarboxylic acid imides) used as starting compounds, are obtainable according to the process described in copending U.S. patent application No. 475,279, filed July 27, 1965.

The compounds obtainable according to the process of the present invention, are novel brilliant orange dyestuffs of high tinctorial strength which are extraordinarily suitable for dyeing synthetic fibers such as acetate rayon, cellulose triacetate and polyamides, in particular, polyethylene-glycol terephthalate. The dyeings possess very good fastness properties, in particular, to light and thermofixation. Furthermore, the dyestuffs may be used for dyeing in the mass synthetic material such as polystyrol, polymethacrylate, polyethylene, polypropylene, polyamide and polyacrylonitrile. The following examples serve to illustrate the present invention, but they are not intended to limit it thereto; the parts being by weight unless otherwise stated.

Example 1

A mixture of 11 parts of benzothioxanthene-3,4-dicarboxylic acid hydrazide and 110 parts of formamide was refluxed for 6 hours. After having been cooled, the reaction mixture was diluted with 150 parts of methanol, subsequently, the reddish dyestuff powder which had precipitated, was filtered with suction, washed with methanol and dried. The yield was almost quantitative.

*Analysis.*—Calculated: C, 69.7; H, 2.8; N, 12.8; S, 9.8. Found: C, 69.5, 69.2; H, 2.9, 2.9; N, 12.6, 12.7; S, 9.8, 9.8.

The dyestuff dyed polyester fibers brilliant orange tints which had very good fastness properties.

Example 2

A mixture of 15.9 parts of benzothioxanthene-3,4-dicarboxylic acid hydrazide, 16.0 parts of ammonium chloride and 110 parts of benzamide was stirred for 18 hours at 260–270° C. The melt was treated with ethanol while still hot, it was filtered with suction, washed with ethanol and water and dried. This dyestuff dyes polyester material orange tints having very good fastness properties.

Example 3

15 parts of benzothioxanthene-3,4-dicarboxylic acid hydrazide were heated together with 150 parts of acetamide and 15 parts of ammonium chloride to 250° C. for 10 hours in a closed vessel and the whole was subsequently worked up in the manner described in Example 2. On polyester material, this dyestuff yielded brilliant orange tints of excellent fastness to light and thermofixation.

Example 4

4.0 parts of 9-methoxy-benzothioxanthene-3,4-dicarboxylic acid hydrazide were reacted with 60 parts of formamide in the manner described in Example 1. The reaction product obtained dyed polyester fibers orange tints having very good fastness properties.

Example 5

A mixture of 17.3 parts of 9,10-dimethylbenzothioxanthene-3,4-dicarboxylic acid hydrazide, 10 parts of zinc chloride and 100 parts of acetamide was heated to 250° C. in a closed vessel. The melt was digested with methanol after having been cooled, and the dyestuff formed was isolated in usual manner. On polyester material, this dyestuff yielded clear orange tints.

Example 6

5.0 parts of benzothioxanthene-3,4-dicarboxylic acid hydrazide were refluxed together with 2.0 parts of zinc chloride and 60.0 parts of benzonitrile for 16 hours. The reaction product which had been isolated in usual manner, was identical with the dyestuff described in Example 2.

Example 7

A mixture of 10.0 parts of benzothioxanthene-3,4-dicarboxylic acid hydrazide, 4.0 parts of ammonium chloride and 100 parts of benzylcyanide was kept at the boil for 24 hours. After usual working up of the reaction mixture, there was obtained a dyestuff which dyed polyester material orange tints.

The following table comprises further orange dyestuffs obtainable according to the process of the present invention:

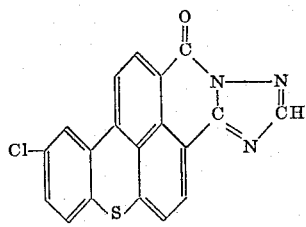

and the corresponding isomeric dyestuff

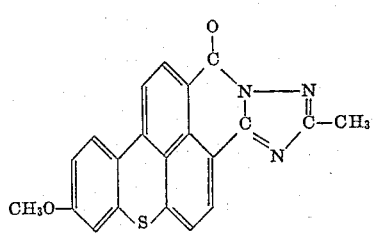

and the corresponding isomeric dyestuff

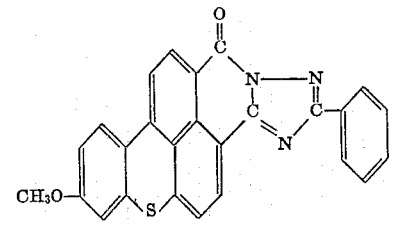

and the corresponding isomeric dyestuff

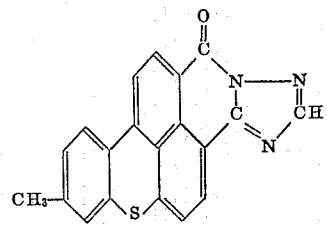

and the corresponding isomeric dyestuff

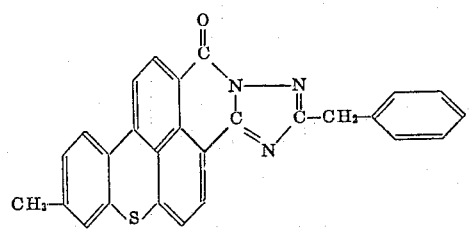

and the corresponding isomeric dyestuff

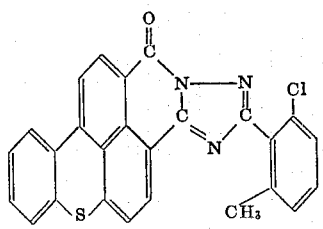

and the corresponding isomeric dyestuff

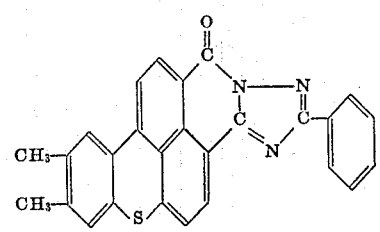

and the corresponding isomeric dyestuff

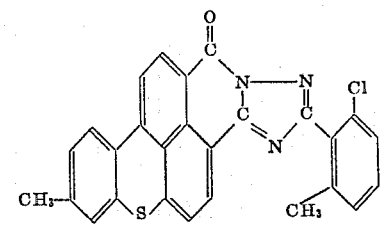

and the corresponding isomeric dyestuff

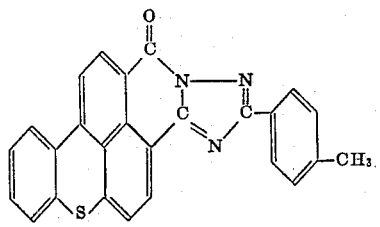

and the corresponding isomeric dyestuff

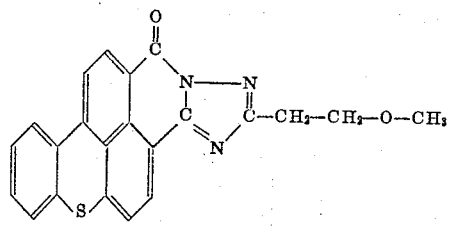

and the corresponding isomeric dyestuff

We claim:
1. Dyestuffs consisting of a mixture of isomeric compounds of the formulae

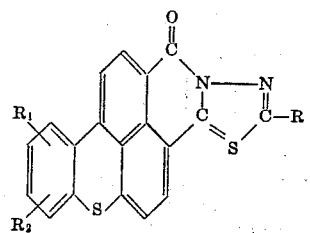

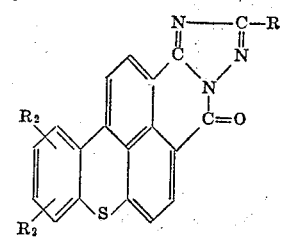

in which R is hydrogen, lower alkyl, phenyl, lower alkyl-phenyl, lower alkyl-chloro-phenyl, chloro-phenyl, benzyl or lower alkoxy-alkyl and $R_1$ and $R_2$ are hydrogen, chlorine, lower alkyl or lower alkoxy.

2. Dyestuffs consisting of a mixture of isomeric compounds of the formulae

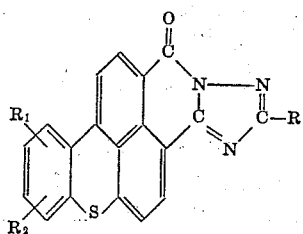

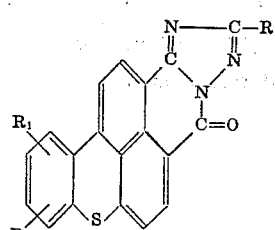

in which R is hydrogen, methyl, phenyl, tolyl, chlorotolyl, benzyl or methoxy-ethyl and $R_1$ and $R_2$ represent hydrogen, chlorine, methyl or methoxy.

3. The dyestuff consisting of a mixture of isomeric compounds of the formulae

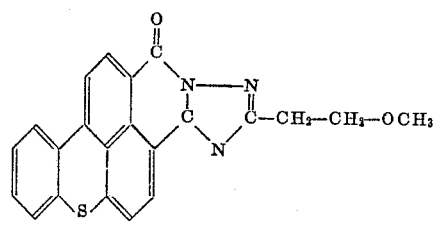

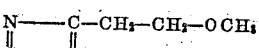

4. The dyestuff consisting of a mixture of isomeric compounds of the formulae

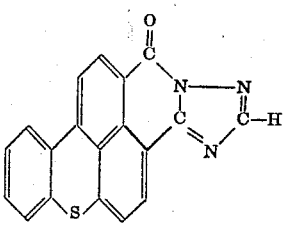

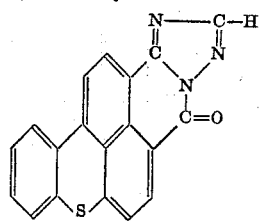

5. The dyestuff consisting of a mixture of isomeric compounds of the formulae

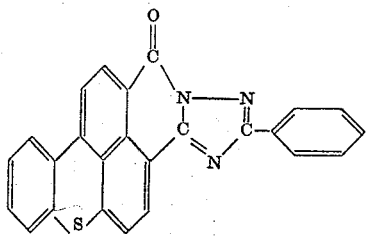

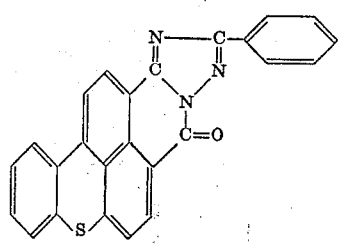

6. The dyestuff consisting of a mixture of isomeric compounds of the formulae

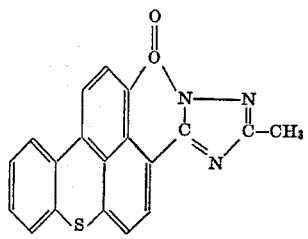

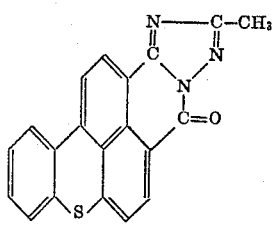

7. The dyestuff consisting of a mixture of isomeric compounds of the formulae

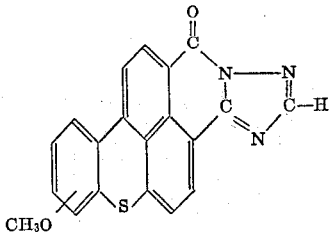

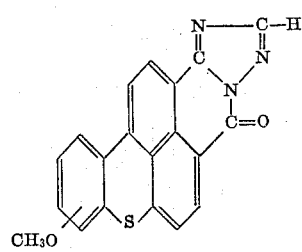

8. The dyestuff consisting of a mixture of isomeric compounds of the formulae

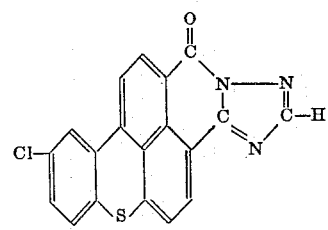

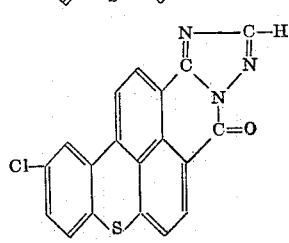

9. Process for preparing dyestuffs consisting of a mixture of isomeric compounds of the formulae

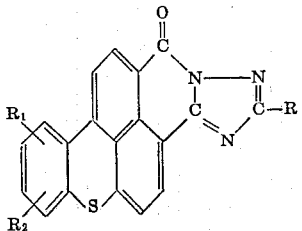

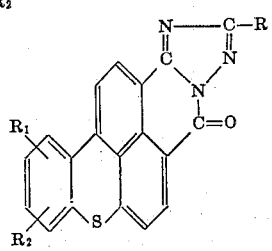

in which R are hydrogen, lower alkyl, phenyl, lower alkyl-phenyl, lower alkyl-chloro-phenyl, chloro-phenyl, benzyl or lower alkoxy-alkyl and $R_1$ and $R_2$ represent hydrogen, chlorine, lower alkyl or lower alkoxy, which comprises reacting benzothioxanthene-3,4-dicarboxyic acid hydrazide of the formula

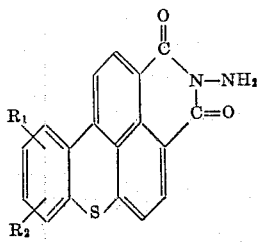

with compounds of the formula $$R-CO-NH_2 \text{ or } R-CN$$

wherein R, $R_1$ and $R_2$ have the meanings given above at a temperature between 170° and 300° C.

10. Process as claimed in claim 9, wherein the reaction is carried out in the presence of zinc chloride or ammonium chloride.

References Cited
UNITED STATES PATENTS

| | | | |
|---|---|---|---|
| 2,949,467 | 8/1960 | Staeuble | 260—249.5 |
| 3,306,904 | 2/1967 | Sieber et al. | 260—282 X |

ALEX MAZEL, *Primary Examiner.*

D. DAUS, *Assistant Examiner.*